US009848086B2

(12) United States Patent
Zilliacus et al.

(10) Patent No.: US 9,848,086 B2
(45) Date of Patent: Dec. 19, 2017

(54) METHODS, APPARATUS AND COMPUTER PROGRAM PRODUCTS FOR DISPATCHING AND PRIORITIZING COMMUNICATION OF GENERIC-RECIPIENT MESSAGES TO RECIPIENTS

(75) Inventors: Martin Zilliacus, Kauniainen (FI); Ari Koli, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1296 days.

(21) Appl. No.: 10/784,450

(22) Filed: Feb. 23, 2004

(65) Prior Publication Data

US 2005/0198183 A1 Sep. 8, 2005

(51) Int. Cl.
| | | |
|---|---|---|
| G06F 15/16 | (2006.01) | |
| H04M 3/527 | (2006.01) | |
| H04M 3/53 | (2006.01) | |

(52) U.S. Cl.
CPC .......... *H04M 3/527* (2013.01); *H04M 3/5307* (2013.01)

(58) Field of Classification Search
CPC ............................. H04M 3/527; H04M 3/5307
USPC ................... 709/206, 207; 358/402; 370/392
See application file for complete search history.

(56) References Cited

U.S. PATENT DOCUMENTS

| | | | | |
|---|---|---|---|---|
| 6,671,355 | B1 * | 12/2003 | Spielman et al. | ......... 379/88.12 |
| 6,912,398 | B1 * | 6/2005 | Domnitz | ...................... 455/461 |
| 6,944,272 | B1 * | 9/2005 | Thomas | ...................... 379/88.13 |
| 7,031,438 | B1 * | 4/2006 | Cheston, III | ............ H04M 1/64 |
| | | | | 379/88.14 |
| 7,171,190 | B2 * | 1/2007 | Ye et al. | .................... 455/412.1 |
| 7,334,000 | B2 * | 2/2008 | Chhatrapati | ...... G06F 17/30471 |
| 2002/0032740 | A1 * | 3/2002 | Stern et al. | .................... 709/206 |
| 2002/0078052 | A1 * | 6/2002 | Cheng | .............................. 707/10 |
| 2002/0160757 | A1 * | 10/2002 | Shavit et al. | ................. 455/414 |
| 2003/0005060 | A1 * | 1/2003 | Davidson et al. | ............ 709/206 |
| 2003/0018729 | A1 | 1/2003 | Miloslavsky | |
| 2003/0061289 | A1 * | 3/2003 | Clissold et al. | .............. 709/206 |
| 2004/0019695 | A1 * | 1/2004 | Fellenstein | .......... G06Q 10/107 |
| | | | | 709/239 |

(Continued)

FOREIGN PATENT DOCUMENTS

| | | | |
|---|---|---|---|
| EP | 1 024 447 | A3 | 8/2000 |
| EP | 1 199 855 | A3 | 4/2002 |

(Continued)

OTHER PUBLICATIONS

Borland, Russell, Running Microsoft Outlook 97, 1997, Microsoft Press, pp. 55, 86, 97, 100, 157-159.*

(Continued)

*Primary Examiner* — Ryan Jakovac
(74) *Attorney, Agent, or Firm* — Ditthavong & Steiner, P.C.

(57) ABSTRACT

Devices, methods and computer program products are provided for dispatching messages to recipients and for prioritizing the dispatch of generic-recipient messages. The device and methods are generally automatic and, thus, require minimal manual intervention by system administrators. Further, the devices and methods are capable of supporting both local and remote message dispatching so as to optimize the system and achieve a lowest cost alternative. In addition, the devices and methods of the present invention dispatch messages over various communication means, such as short-range wireless, Internet, cellular networks and the like.

45 Claims, 6 Drawing Sheets

(56) References Cited

U.S. PATENT DOCUMENTS

| | | | |
|---|---|---|---|
| 2004/0153523 A1* | 8/2004 | Albal et al. | 709/206 |
| 2005/0080863 A1* | 4/2005 | Daniell | 709/206 |
| 2005/0114453 A1* | 5/2005 | Hardt | 709/206 |
| 2005/0149622 A1* | 7/2005 | Kirkland et al. | 709/207 |
| 2005/0182820 A1* | 8/2005 | Kashima et al. | 709/206 |
| 2006/0007932 A1* | 1/2006 | Simyon | 370/392 |
| 2006/0017983 A1* | 1/2006 | Syri et al. | 358/402 |

FOREIGN PATENT DOCUMENTS

| | | | |
|---|---|---|---|
| WO | WO 01/17276 A3 | 3/2001 | |
| WO | WO 01/39053 A2 | 5/2001 | |

OTHER PUBLICATIONS

Collins English Dictionary, 2000, HarperCollins Publishers.*
Chinese office action for corresponding CN application No. 200580012504.4 dated Dec. 6, 2010, pp.
Chinese office action for corresponding CN application No. 2005800125044 dated Feb. 6, 2009, pp 1-15.
Chinese office action for corresponding CN application No. 2005800125044 dated Jan. 15, 2010, pp. 1-11.
European office action for corresponding EP application No. 05 702 489.5-2416 dated Sep. 28, 2010, pp. 1-5.
European Office Action for corresponding EP application No. 05 702 489.5-2416 dated Mar. 31, 2011, pp. 1-5.
Chinese office action for corresponding CN application No. 200580012504.4, Jun. 24, 2011, pp. 1-9.

* cited by examiner

| 500 | 510 | 520 | 530 | 540 | 550 | 560 | 570 | 580 | 590 | 600 |
|---|---|---|---|---|---|---|---|---|---|---|
| Msg id | Sender | Type | Subject | Content | Priority | Time sent | Time received | Dispatched? | To | Ack? |

Data for each received message

FIGURE 5A

| 610 | 620 | 630 | 640 | 650 | 660 |
|---|---|---|---|---|---|
| Employee id | MSISDN | Bluetooth MAC address | WLAN MAC address | IM address | Email address |

Data for each employee, on- or off-site

FIGURE 5B

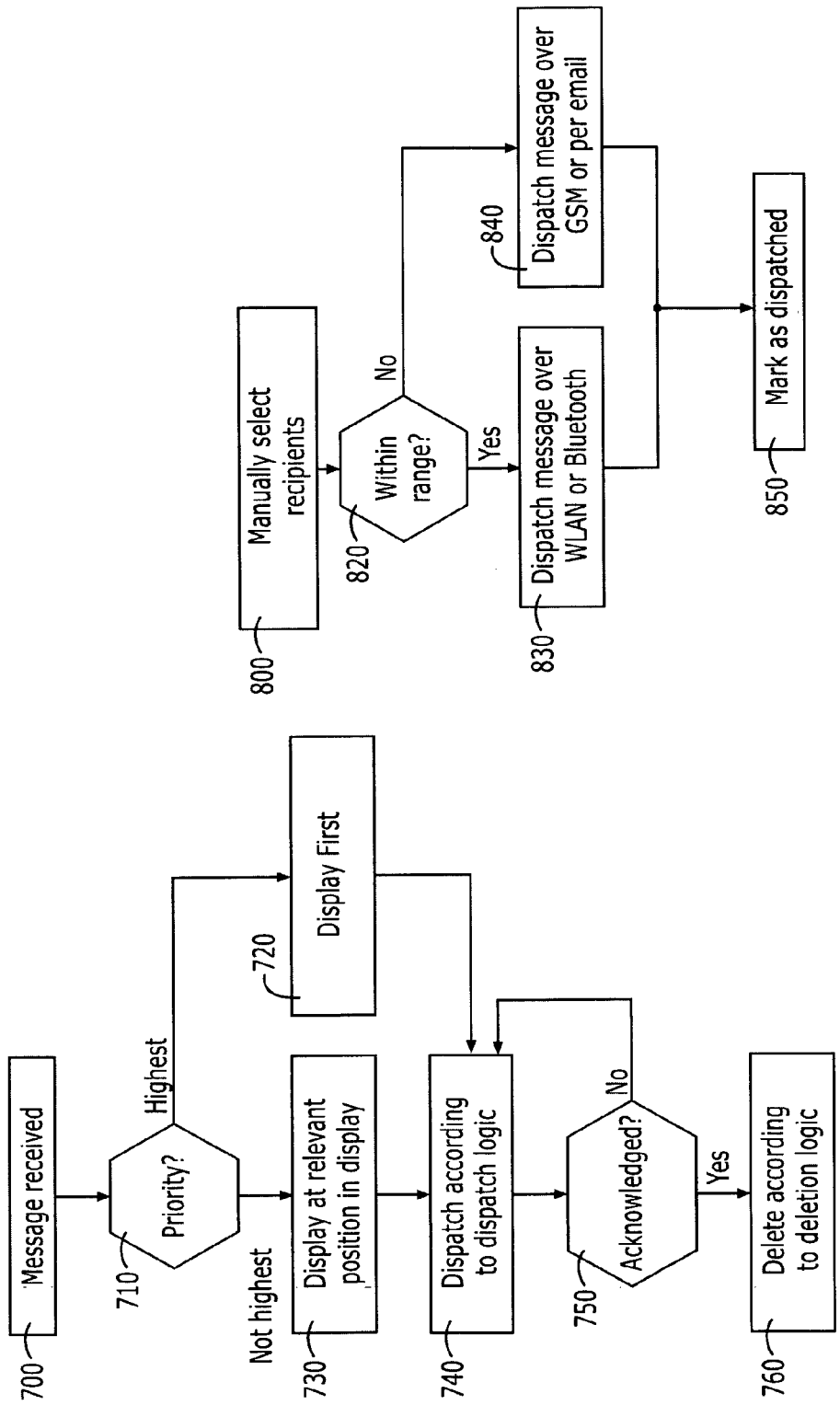

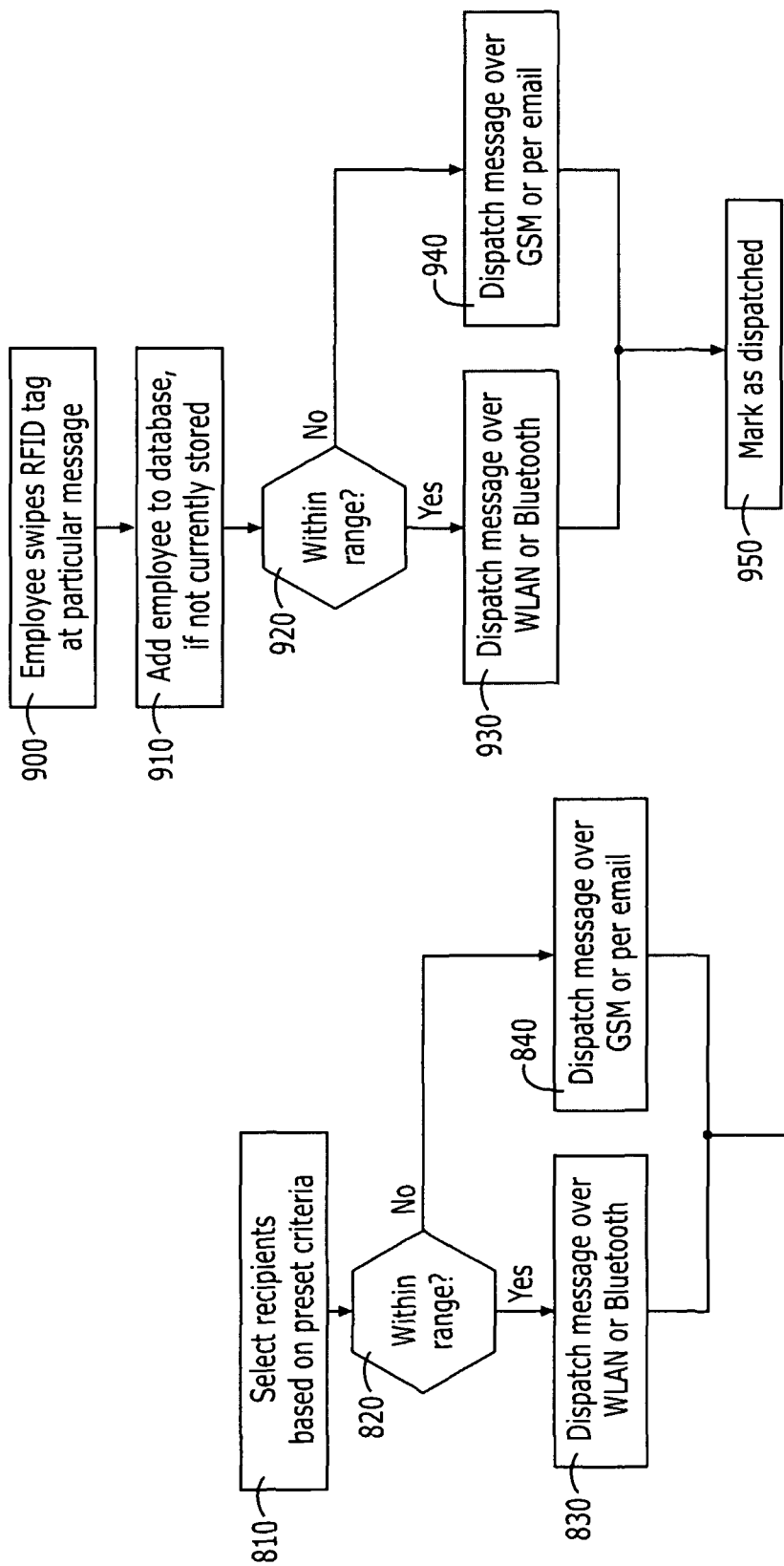

METHODS, APPARATUS AND COMPUTER PROGRAM PRODUCTS FOR DISPATCHING AND PRIORITIZING COMMUNICATION OF GENERIC-RECIPIENT MESSAGES TO RECIPIENTS

FIELD OF THE INVENTION

This invention relates to messaging in a digital communication network, and more particularly, relates to determining recipients and dispatching generic-recipient messages in a digital communication network.

BACKGROUND OF THE INVENTION

In today's business environment an individual receives digital messages from various sources and by various communication means. For example, an individual may receive messages from a fellow employee, from a customer, from a supplier or from any other relevant business contact. The sender of message may be internally located at the same worksite as the individual receipt, as typically is the case with fellow employees, or may be externally located outside of the workplace, as typically is the case with customers or suppliers. In addition to the variance in message source, digital messages are communicated to individuals by various digital means, such as electronic mail, voice mail, Short Message Service (SMS) communication, Multimedia Message Service (MMS) communication and the like. Moreover, the recipient of these messages is provided multiple means for receiving the messages. For example, email accounts can be accessed from a personal computer, a wired or wireless laptop computer, a wireless Personal Digital Assistant (PDA), a wireless cellular telephone or any other conceivable wired or wireless device capable of digital communication. Even voice mail, once limited to access via the wired or wireless telephone, can now be accessed via the personal computer, laptop computer, PDA or the like.

The vast majority of the digital messaging communication is conducted on a person-to-person basis. For example, one individual sends another individual an email or an SMS communication or one individual initiates a cellular telephone call to another individual. Much more limited are the communication options for person-to-group, person-community, person-to-place or person-to-application communication. This type of communication is also referred to herein as generic-recipient message, in which the user does not send the message to a specific individual but rather to a group, a community, a location or an application.

Email allows an individual to send a group email to multiple recipients; however, in this regard the user forms the group email address from a collection of known individual email addresses. In practice, the group email provides person-to-person communication to multiple recipients. The group email communication does not allow the sender to send an email correspondence to a group if the sender is unaware of the individuals that form the group.

The concept of generic-recipient messaging is best explained by providing examples.

An individual wishes to contact Company X and inquire about the status of a particular product that they recently ordered from Company X. The individual wishes to communicate via email. Unless the individual is aware of the specific individual within Company X that is handling this order, email communication can become somewhat problematic. Typically, the individual's only email option is to send an email correspondence to a generic Company X email address and have a system administrator manually dispatch the email to a perceived intended recipient. Thus, the sender of the email is provided very little assurance that the email will be dispatched to the proper entity handling the order. In many of these instances, the individual's email is dispatched to the incorrect recipient and, thus, the individual never receives an appropriate reply.

This same dilemma presents itself in the example of an individual trying to contact Company X via telephone communication to status an outstanding order. The individual is unaware of the direct line telephone number of the individual handling the account and, thus, the only option presented to the individual is to contact Company X's main switchboard and either ask for a specific department or explain to the main switchboard operator the question at hand. All too often the switchboard operator will dispatch the call to the incorrect recipient, thus, frustrating the individual who is trying to status an outstanding order. In other instances, the switchboard operator is unaware of whether a recipient is available to receive the call and will invariably lead the individual caller into the unavailable recipient's voice mail system. In the same regard, automated key-tone or voice command systems, which obviate the need for a switchboard operator, are often cumbersome and confusing to the user and provide even greater opportunity to dispatch the call to an incorrect recipient.

In addition to properly dispatching these generic-recipient messages to proper recipients, a need exists to identify and prioritize the dispatch of generic-recipient messages that require priority dispatching. For example, in the email scenario the sender of the email may emphasize the messages importance by flagging the message or otherwise highlighting the subject header or contents or the message. However, if the sender of the email fails to designate the message as a priority message, it is unlike that the system administrator who dispatches the message will recognize the importance and subjectively provide for the requisite higher priority. Additionally, even in the instance in which the system administrator receives a message marked by the sender as requiring priority, manual dispatch provides no assurance that the priority will be forwarded to the determined recipient upon dispatch.

Therefore, a need exists to develop a system and methods for dispatching generic-recipient messages to proper recipients. The desired system should function without an expensive private telephone network or a central system for short incoming text, graphic or voice communication. In addition, the desired dispatch system should be generally automatic and, thus, require minimal manual intervention by system administrators. The desired system and method should be capable of supporting both local and remote generic-recipient message dispatching so as to achieve a lowest cost alternative. In addition, the desired system and method should support the dispatch of generic-recipient messages over various communication means, such as short-range wireless, Internet, cellular networks and the like. A need also exists to develop a system and methods for providing dispatch priority to generic-recipient messages. The desired system should provide for multiple priority schemes, such that priority can be given to generic-recipient messages depending on the communication network used to dispatch the message. Additionally, the priority system and methods should be automated to allow for message priority to be determined with minimal manual intervention by system administrators.

BRIEF SUMMARY OF THE INVENTION

The present invention provides for devices, methods and computer program products for dispatching generic-recipient messages to determined recipients and for prioritizing the dispatch of generic-recipient messages.

The invention utilizes a network hub device that receives generic-recipient messages and executes a dispatch application to determine one or more recipients. The system functions without an expensive private telephone network or a central system for short incoming text or voice communication. The generally automatic nature of the dispatch application provides for minimal manual intervention by system administrators. In addition, the network hub is typically located within the network such that it is capable of supporting both local and remote message dispatching. The network hub device and associated methods support dispatch of generic-recipient messages over various communication means, such as short-range wireless, Internet, cellular networks and the like. In one embodiment, the network hub is associated with a display device, such that received generic-recipient messages can be prominently displayed to potential recipients prior to dispatch via short-range wireless communication. In addition, the network hub device may be a wireless device to provide for physical portability of the hub.

Additionally the network hub and related methods may execute a dispatch priority application that automatically attaches dispatch priority to messages based on predefined priority attributes. Multiple priority schemes are feasible to accommodate for the communication network used to dispatch the message. For example, a message that will be prominently displayed prior to dispatch may be granted display priority or priority may be defined by the communication network used to dispatch a message.

The invention may be defined by a method for determining a recipient of a generic-recipient message and dispatching the message to the determined recipient. The method includes the steps of receiving a message at a network hub, determining predefined attributes of the received message, determining the recipients for the message based upon the predefined attributes and dispatching the message to the determined recipients. The message may be a Short Message Service (SMS) message, a Multimedia Message Service (MMS) message, an electronic mail (email) message, a voice message or the like. The network hub will typically be a wireless network hub, although a wired network hub is also within the concepts of the present invention.

The predefined attributes of the message may include the type of message (i.e., SMS, MMS, email, voice, etc.), the sender of the message, the subject of the message and the content of the message. The step of determining the recipients for the message based upon the predefined attributes may further include the step of correlating the predefined attributes of the message with stored information related to potential recipients.

The step of dispatching the message to the determined recipients may further include the step of assigning recipient Radio Frequency (RF) identifiers to the message. In this regard, message recipients may receive the message by communicating with the network hub via an RF tag and corresponding RF reader. Additionally, the step of dispatching the message to the determined recipients may further include the step of displaying the message on a display associated with the network hub. By displaying the messages on a display potential recipients can view, at least a portion of, the message such as the subject header and determine if they are the determined recipient of the message. If a potential recipient determines that they are the intended recipient they may receive the message by short-range wireless communication techniques, such as RFID communication or the like. The dispatching of the message to the determined recipients may involve transmitting the message to the determined recipients via a standard communication medium, such as short-range wireless communication, Internet communication, SMS communication, MMS communication or the like.

In a further embodiment of the invention a network hub device for determining recipients of generic-recipient messages and dispatching the to determined recipients is defined. The network hub device includes a processing unit and a memory unit in communication with the processing unit that stores information related to the potential recipients. Additionally, the network hub includes a message reception application executed by the processing unit that receives generic-recipient messages from various communication networks and determines predefined attributes of received messages. The network hub also includes a message recipient determination and dispatch application executed by the processing unit that compares the predefined attributes to the information related to the potential recipients to determine the recipients.

The network hub may further include a Radio Frequency (RF) transceiver for dispatching assigned messages to determined recipients via lower power RF communication. Additionally, the network hub may include a Global System for Mobile communications (GSM) application for dispatching messages to determined recipients via a digital cellular network or a similar communication network application, such as an Internet application, a Short Message Service (SMS) application, a Multimedia Message Service (MMS) application or the like.

The network hub device may also include an associated display that visually displays, at least a portion of, the message. By displaying the assigned messages on a display potential recipients can view the message and determine if they are the intended recipients of the message. If a potential recipient determines that they are the intended recipient they may receive the message by short-range wireless communication techniques, such as RFID communication or the like.

In yet another embodiment of the invention a computer program product is described for automatically determining recipients of generic-recipient messages. The computer program product includes a computer readable storage medium having computer-readable program instructions embodied in the medium. The computer-readable program instructions include first instructions for storing information related to potential message recipients and second instructions for receiving a message at a network hub, typically a wireless network hub, and determining predefined attributes associated with the message. The message may include any conventional digital message such as, a Short Message Service (SMS) message, a Multimedia Message Service (MMS) message, an electronic mail (email) message and a voice message. The predefined attributes associated with the message may include the type of message, sender of the message, subject of the message and content of the message.

Additionally, the computer-readable program instructions includes third instructions for determining the message recipients of the message by comparing the predefined attributes associated with the messages to the stored information related to potential message recipients.

The computer-readable program instructions may further include fourth instructions for dispatching the message to the determined message recipient(s). Dispatching may involve communicating the messages via short-range wireless communication, wired or wireless Internet communication, SMS communication, MMS communication or the like. Dispatching may include the step of assigning recipient Radio Frequency (RF) identifiers to the message. In this regard, a transponder within the network hub may communicate via RF with tags in the possession of the recipients. Additionally, dispatching may include displaying, at least a portion of the message on a display associated with the network hub, so that intended recipients are visually aware that messages are designated for their receipt.

The invention is further defined by a method for prioritizing generic-recipient messages at a network hub. The method includes the steps of receiving a message at a network hub, determining predefined attributes of the received message, determining whether the message has priority based on the predefined attributes and prioritizing the message if a determination is made that the message has priority. The generic-recipient messages will typically include various message formats including SMS, MMS, email and voice message. The network hub will typically be a wireless network hub, however; a wired network hub is also possible.

The step of determining whether the message has priority based on the predefined attributes may further include determining whether the message has display priority based on the predefined attributes. Display priority may take the form of displaying the prioritized message in a prominent position on a display associated with the hub, create a pop-up type window for the display of the prioritized message or otherwise highlighting the display of the prioritized message.

Additionally, the step of determining whether the message has priority based on the predefined attributes may further include determining whether the message has dispatch priority based on the predefined attributes. Dispatch priority may take the form of prioritized the communication medium used to dispatch the message, prioritizing a sequence of recipients to whom the message may be dispatched, prioritizing the time of dispatch and the like.

The step of determining predefined attributes of the group-addresses message may define the predefined attributes as the type of message, the sender of the message, the subject of the message, the content of the message or any other message attribute may be included as a predefined parameter.

The invention is also embodied in a network hub device for prioritizing generic-recipient messages. The network hub device includes a processing unit, a memory unit in communication with the processing unit that stores priority information, a message reception application executed by the processing unit that receives generic-recipient messages from one or more communication networks and determines predefined attributes of received generic-recipient messages. The network hub also includes a message priority application executed by the processing unit that compares the predefined attributes to the priority information to determine if the received message requires prioritization. The predefined attributes will typically include attributes defined in the message, such as a sender of the message, a type of the message, a subject of the message, the content of the message and the like.

Prioritization may be defined as display prioritization or dispatch prioritization. In network hubs that define priority in terms of display priority, the memory unit will store display priority information and the message priority application will compare the predefined attributes to the display priority information to determine if the received message requires display prioritization. In those embodiments that implement display priority, the network hub may include a display associated with the hub that displays the messages. Display prioritization may take the form of listing prioritized messages first, displaying prioritized messages in a pop-up style window or otherwise highlighting the display of the prioritized message.

In network hubs that define priority in terms of dispatch priority, the memory unit will store dispatch priority information and the message priority application will compare the predefined attributes to the dispatch priority information to determine if the received message requires dispatch prioritization. Dispatch priority may take the form of prioritizing the time at which messages are dispatched, the communication medium used to dispatch the message or a priority sequence of whom the message will be dispatched to.

In yet another embodiment of the invention a computer program product is described for prioritizing generic-recipient messages at a network hub. The computer program product includes a computer readable storage medium having computer-readable program instructions embodied in the medium. The computer-readable program instructions include first instructions for first instructions for storing information related to message priority and second instructions for receiving a message at a network hub and determining predefined attributes associated with the message. The group message priority information may be display priority information or dispatch priority information.

The message may include any conventional digital message such as, a Short Message Service (SMS) message, a Multimedia Message Service (MMS) message, an electronic mail (email) message and a voice message. The predefined attributes associated with the message may include the type of message, sender of the message, subject of the message and content of the message.

Additionally, the computer-readable program instructions includes third instructions for determining whether the message has priority by comparing the predefined attributes associated with the generic-recipient messages to the stored information related to message priority.

Therefore, the present invention provides for devices, methods and computer program products for determining a recipient for a generic-recipient message, dispatching the generic-recipient message to determined recipients and prioritizing the dispatch of the generic-recipient message. The device and methods function without an expensive private telephone network or a central system for short incoming text or voice communication. In addition, the device and methods are generally automatic and, thus, require minimal manual intervention by system administrators. Further, the devices and methods are capable of supporting both local and remote message dispatching so as to optimize the system and achieve a lowest cost alternative. In addition, the devices and methods of the present invention dispatch generic-recipient messages over various communication means, such as short-range wireless, Internet, cellular networks and the like. The devices and methods also provide for multiple priority schemes, such that priority can be given to messages depending on the communication network used to dispatch the message. Additionally, the priority system and methods should be automated to allow for message priority to be determined with minimal manual intervention by system administrators.

BRIEF DESCRIPTION OF THE DRAWINGS

Having thus described the invention in general terms, reference will now be made to the accompanying drawings, which are not necessarily drawn to scale.

Figure 1:
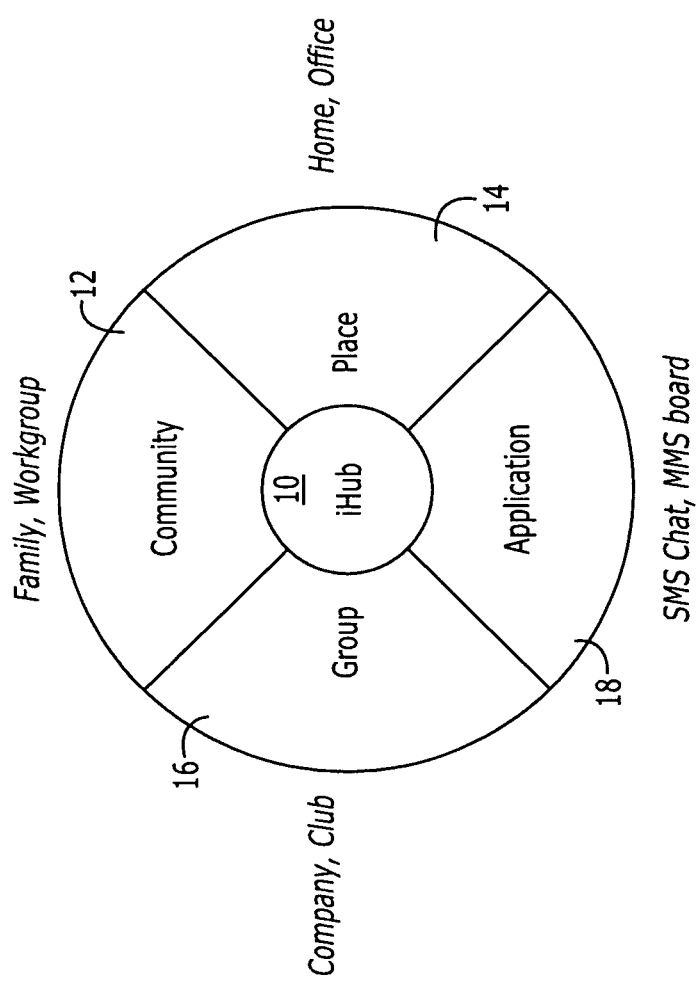

FIG. 1 is block diagram illustrating the network hub and messages that are typically trafficked at the hub, in accordance with an embodiment of the present invention.

Figure 2:
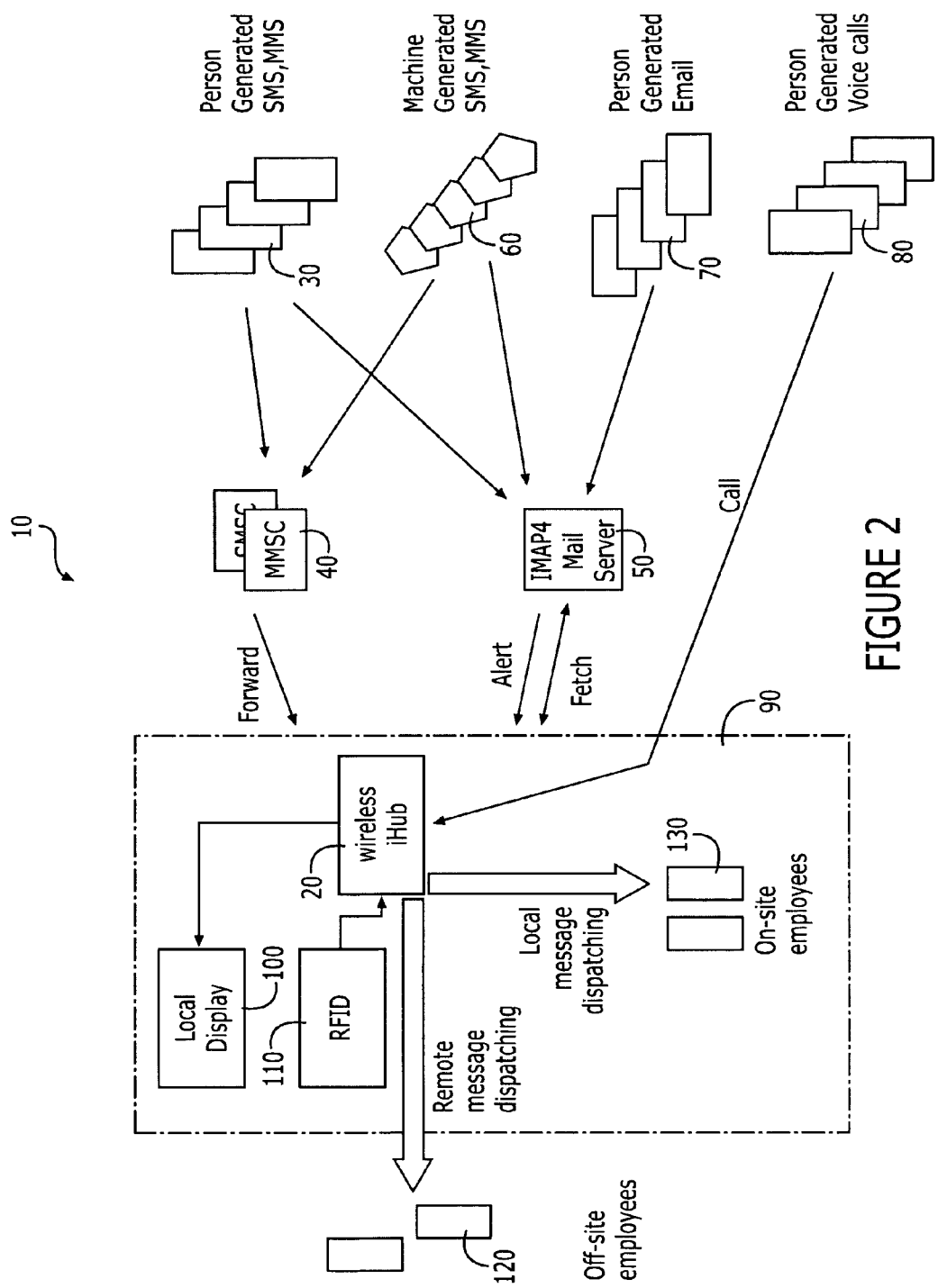

FIG. 2 is block diagram of a system incorporating a network hub for automated recipient determination of generic-recipient messages, message dispatching and/or message prioritizing, in accordance with an embodiment of the present invention.

Figure 3:
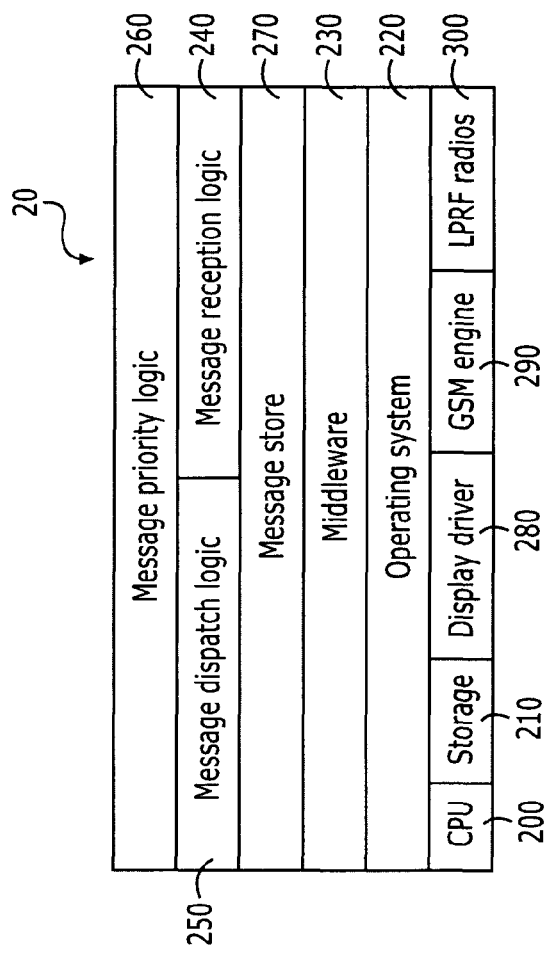

FIG. 3 is a block diagram of a network hub device that executes automated recipient determination of generic-recipient messages, message dispatching and/or message prioritizing, in accordance with one embodiment of the present invention.

Figure 4:
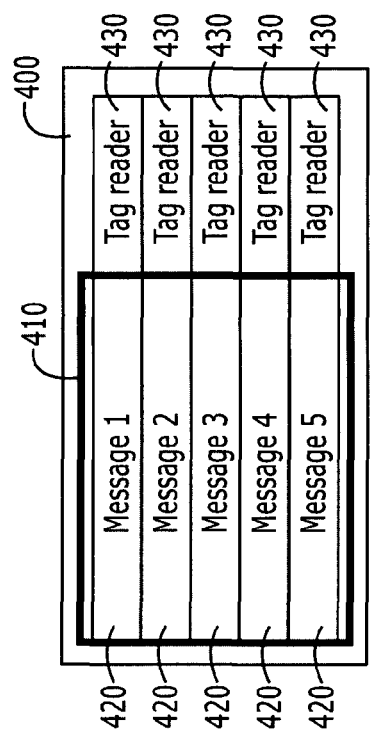

FIG. 4 is a block diagram of recipient-determined messages being displayed and awaiting short-range wireless dispatch, in accordance with one embodiment of the present invention.

FIGS. 5A and 5B are block diagrams of examples of information fields for stored messages and stored potential recipients, in accordance with an embodiment of the present invention.

FIG. 6 is a flow diagram depicting a method for automated priority assignment and dispatch of generic-recipient messages, in accordance with one embodiment of the present invention.

FIGS. 7A and 7B are flow diagrams depicting manual and automated methods for dispatch of messages implementing short-range wireless dispatch, in accordance with embodiments of the present invention.

FIG. 8 is a flow diagram depicting a method for automated dispatch of messages implementing short-range wireless dispatch, in accordance with embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is defined by methods, devices and computer programs for determining recipients of generic-recipient messages, dispatching the generic-recipient messages to the determined recipients and for prioritizing the dispatch of the generic-recipient messages.

The invention utilizes a network hub device that receives generic-recipient messages and executes a message recipient determination and dispatch application to determine one or more recipients for the message and to dispatch the message to the recipients. The system functions without an expensive private telephone network or a central system for short incoming text or voice communication. The generally automatic nature of the dispatch application provides for minimal manual intervention by system administrators. In addition, the network hub is typically located within the network such that it is capable of supporting both local and remote message dispatching. The network hub device and associated methods support dispatch of messages over various communication means, such as short-range wireless, Internet, cellular networks and the like. In one embodiment, the network hub is associated with a display device, such that messages can be prominently displayed to determined recipients prior to dispatch via short-range wireless communication. In addition, the network hub device may be a wireless device to provide for physical portability of the hub.

FIG. 1 represents the network hub device 10 and examples of environments in which the network hub is utilized. For example, the network hub may be utilized in a community environment 12 in which individual send messages to a specified family, workgroup or the like. Upon receipt of the community message, the network hub determines which family or workgroup member the message is intended for or which family or workgroup member is most appropriate for receipt of the message. In the community environment the workgroup may be located at different worksites and the family may reside at different residences. The community environment is in contrast to the location environment 14, in which individuals send messages to a specific local, such as an office, a home, a school or the like. Upon receipt of the location message, the network hub determines which individual or individuals within the location the message is intended for or which individual or individuals within the location is/are most appropriate for receipt of the message.

Similar to the community environment 12, the network hub may be utilized in a group environment 16 in which individuals send messages to a specific organization, corporation or club. Upon receipt of the group message, the network hub determines which individual or individuals within the group the message is intended for or which individual or individuals within the group is/are most appropriate for receipt of the message. In the group environment the potential recipients may be physically located anywhere. Another example is utilization of the network hub in connection with certain applications 18, such as Short Message Servicing chat or vote or Multimedia Message Service boards.

Additionally the network hub and related methods may execute a dispatch priority application that automatically attaches dispatch priority to generic-recipient messages based on predefined priority attributes. Multiple priority schemes are feasible to accommodate for the communication network used to dispatch the message. For example, a message that will be prominently displayed prior to dispatch may be granted display priority or priority may be defined in the communication network used to dispatch a message.

FIG. 2 is a block diagram illustrating a communications network that incorporates a network hub device, in accordance with an embodiment of the present invention. The communications network 10 includes a network hub device 20 that serves to determine recipients of generic-recipient messages, dispatch the messages to the determined recipients and/or prioritize the generic-recipient messages. In the illustrated embodiment the network hub is a wireless network hub, however; in alternate embodiments of the invention the network hub may be a conventional wired network hub. The wireless embodiment of the network hub provides for device portability.

The network hub device 20 is capable of receiving, dispatching and/or prioritizing generic-recipient messages from various communication sources. The FIG. 2 embodiment illustrates an example of four distinct communication sources. User generated Short Message Service (SMS) or Multimedia Message Service (MMS) messages 30 can be communicated to the network hub, typically through intermediary network points, such as SMS or MMS center 40 or a network mail server 50. In a similar fashion, machine generated SMS or MMS messages 60 can be communicated to the network hub, typically through intermediary network points, such as SMS or MMS center 40 or a network mail server 50. The network hub may also receive messages from user generated email 70 communication that is communicated via a network mail server 50. In addition, the network hub may receive voice messages 80 communicated, wirelessly or wired, over a standard telephony network.

In the FIG. 2 embodiment the network hub 20 is physically located at a place of employment 90. However, the network hub of the present invention may be physically located at other advantageous locations within the communication network 10 without departing from the inventive concepts herein disclosed. Physical location at a place of employment is illustrated here to highlight various optional advantageous features of the present invention, such as low power short-range communication capabilities. In this same regard, the network hub could be physically located at other locales that typically receive messages and require dispatch of the messages.

In the illustrated embodiment the network hub is in communication with an optional display 100. The optional display serves as a joint message board and, as such, the display may be a conventional personal computer display or the display may be a large bulletin board display capable of being viewed simultaneously by multiple employees within the viewing area. The display allows for the messages that have been assigned recipient(s) to be displayed, typically in an abbreviated list type format, such that employees that view the display can determine if a message has been assigned for their dispatch. In one embodiment of the invention dispatch of the messages may be accomplished by short-range communication, such as Radio Frequency Identification (RFID), Bluetooth®, or any other suitable form of short-range communication. In the RFID scenario, the employee is equipped with an RFID tag 110 and the network hub embodies a tag reader (not shown in FIG. 2). The tag may be embodied within an identification card, a key fob or within a device, such as a cellular telephone, personal digital assistant (PDA) or the like. The employee will routinely bring the tag in the general vicinity of the tag reader, commonly referred to as "swiping" the tag, for the purpose of receiving messages that have been assigned to the employee. Alternatively, the device, such as a cellular telephone, PDA or the like, may be equipped with a tag reader and the tag may be embodied in the network hub or a device associated with the network hub. In this regard, the optional display serves to provide notice to an employee that a message has been dispatched to their attention and allows the employee to non-routinely bring their tag or reader in the general vicinity of the corresponding tag reader or tag (i.e., the network hub), for the purpose of receiving the message.

FIG. 3 provides a block diagram of a network hub 400, in accordance with an embodiment of the present invention. In this embodiment of the invention the network hub is in communication with a display that lists, within the viewable area 410 of the display, an identifiable portion of the assigned message 420, typically the subject header, the sender and/or the determined recipient. The order of the listing of the assigned messages may be determined by the temporal order of receipt at the network hub or the order may be determined by a priority application implemented at the network hub, which is discussed at length infra. In one embodiment of the invention, each message will be assigned a short-range wireless communication identifier, such as an LPRF identifier 430, at the network hub. The identifier will typically associate the message with one or more recipients or, more specifically, the tag associated with the recipients receiving device (i.e., cellular telephone, PDA or the like). As such, in embodiments in which the network hub possesses short-range wireless communication capability, the hub is equipped with an appropriate transceiver, processor/controller, antennae and serial data system to provide for short-range wireless communication.

In addition to short-range communication, the network hub may be configured to dispatch messages by other conventional communication means. For example, the network hub may be configured to dispatch messages to off-site employees 120 or any other external entity by communication means, such as email communication, Short Message Service (SMS) communication, Multimedia Message Service (MMS) communication, voice communication, paging communication or the like. The external communication of messages may be wireless communication or it may be wired communication. Additionally, the network hub may be configured to dispatch messages to on-site employees 130 or any other internal entity by communication means such as email communication, Short Message Service (SMS) communication, Multimedia Message Service (MMS) communication, voice communication, paging communication or the like.

In addition to dispatching received generic-recipient messages, the network hub may be configured to send messages either internally within the physical confines of the hub, typically by short-range wireless communication, or externally, typically by SMS, MMS, email or voice communication.

FIG. 4 is a block diagram illustrating the architecture of a network hub, in accordance to an embodiment of the present invention. In the illustrated embodiment the network hub is configured to automatically determine a recipient of a generic-recipient message, dispatch the generic-recipient message to the determined recipient and/or prioritize the generic-recipient message according to a chosen predetermined parameter. However, in alternate embodiments of the present invention the network hub may be configured such that it implements either, but not both, automatic determination of a recipient of a generic-recipient message and subsequent dispatch or prioritization of generic-recipient messages.

The network hub device 20 will include a central processing unit (CPU) 200 that it is communication with a storage unit or memory device 210. The memory device may store information related to potential recipients of generic-recipient messages (i.e., employees or the like), information related to priority attributes or the like. The processing unit will execute an operating system 220 that controls the peripheral devices and provides a software platform for application routines. The operating system may be Windows® (Microsoft Corporation, Redmond, Wash.) based, OS/2 (Apple Corporation, Cupertino Calif.) based, an open-source operating system, such as Linux or any other suitable operating system. The processing unit of the network hub will additionally, typically, execute middleware 230 that provides for connectivity between separate and distinct applications. In the present of the middleware provides a link between the message reception logic 240, the message recipient determination and dispatch logic 250 and the message priority logic 260.

The message reception logic 240, also referred to as the message reception application is executed by the central processing unit 200 and is responsible for receiving generic-recipient messages from one or more communication networks, such as a SMS network, a MMS network, an email network, telephone network or the like. The message reception logic is typically in communication with message storage 270 that provides for the storage of messages and information related to received messages.

The message recipient determination and dispatch logic 250, also referred to as the message recipient determination and dispatch application, is executed by the central processing unit 200 and is responsible for determining recipients for messages. The message recipient determination and dispatch logic determines predefined attributes of interest related to the generic-recipient messages, such as the message sender, the message subject, the message form, the message content and the like. Once the predefined attributes of interest are determined they are compared to recipient information stored in memory device 210. The comparison process will logically determine one or more recipients for the message.

The network hub may additionally include message priority logic 260, also referred to as the message priority application, which is executed by the central processing unit 200 and is responsible for determining dispatch priority for the generic-recipient messages received at the network hub device. The message priority application may prioritize the messages in terms of display priority, recipient dispatch priority, mode of dispatch or any other priority designated by the message or the recipient. The message priority application will determine priority either based on the receipt information stored in memory device 210 or based on predefined attributes related to the message, such as sender, content, subject, etc.

In one embodiment of the invention the message priority application will determine display priority. Display priority provides for assigned messages that are determined to have display priority to be displayed, typically on a display associated with the network hub, in a prioritized fashion. Prioritized fashion may include listing the priority messages first, creating a separate pop-up-type window for a priority message, highlighting the priority message or otherwise prominently featuring the priority message.

In an alternate embodiment the message priority application may prioritize dispatch recipients. For example, a message determined to be sent from sender "X", is first dispatched to employees "A", "B" and "C". If no receipt acknowledgement is received by the hub from employees "A", "B" and "C" within a specified time period, the message is then dispatched to the supervisor of employees "A", "B" and "C". If no receipt acknowledgement by the hub from the supervisor within a specified time period, the message is then dispatched to the site manager. Further, the message priority application may prioritize the mode of dispatch. For example, messages sent from a predefined sender or messages including predefined content, such as, voice communication, in the form of a telephone call or voice mail. In other embodiments of the message priority application priority may be determined by the application of the network hub and the priority desired by the users of the network hub.

Additionally, the network hub 20 may include a display driver 280 that is executed by the CPU 200 and provides for control over a display (not shown in FIG. 4) that is associated with the network hub. An associated display provides for the network hub to display messages that have are either awaiting dispatch or have been dispatched. The network hub may additionally include a Global System for Mobile communication (GSM) engine 290 that provides for the network hub to receive and transmit digital cellular communications and/or a Low Power Radio Frequency (LPRF) transponder 300. The LPRF transponder provides for the network hub to transmit messages, via short-range wireless communication, to devices equipped with LPRF tags.

FIGS. 5A and 5B provide examples of message information and potential recipient information stored at the network hub, in accordance with an embodiment of the present invention. For example, FIG. 5A provides received message information fields, including message identification 500, sender 510, type 520, subject 530 and content 540. The message identification field may include a message id number, an email address or some other form of message identification. The sender field will identify the name of the individual who sent the message. The type field will indicate the type of message, such as email message, SMS message, MMS message, voice message or the like. The subject field will identify the subject matter of the message, such as found in an email header listing. The content of the message may include the entire content of the message or an abbreviated form of the content of the message.

In addition, the message information fields may include message priority 550, time sent 560, time received 570, dispatched status 580, dispatched recipient 590 and acknowledgement status 600. The message priority field will be provided for in those embodiments of the invention that implement message priority and will indicate whether the message has been determined to be a priority message. The time sent and the time received fields will indicate the time at which the sender of the message transmitted the message and the time at which the network hub received the message. The dispatch status will indicate whether the message has been dispatched. For example, in short-range communication dispatch will occur when the tag (i.e., the recipients device) comes in close proximity with the hub, such that the tag is read by the hub. In other scenarios, dispatch may occur when the message is transmitted via email, SMS or some other form of network communication. The dispatched recipient field will identify the one or more recipients of the message as determined by the message recipient determination and dispatch application. The acknowledgement field will indicate whether the message has been dispatched and received by the determined recipients.

FIG. 5B provides an example of information stored at the network hub related to potential recipients of generic-recipient messages, in accordance with an embodiment of the present invention. The network hub uses stored information related to potential recipients to determine whom a message is dispatched to and to determine how it is dispatched. The potential recipient information fields may include a potential recipient ID 610, a Mobile Station International ISDN Number (MSISDN) 620, Bluetooth MAC address 630, WLAN MAC address 640, instant message address 650 and email address 660. The potential recipient ID will typically be used when the potential recipients are employees or some other group of recipients that are characteristically identified by an identification number. The Bluetooth MAC address and WLAN MAC address identify devices that are associated with the potential recipient and are capable of communicating in either Bluetooth or WLAN short-range wireless communication. The instant message address and email address identify potential recipients according to their instant message or email address. Additionally, other potential recipient attributes may be stored at the network hub as dictated by the application.

FIG. 6 illustrates a flow diagram of an overall network hub process for message receipt, prioritizing generic-recipient messages and message dispatch, in accordance with an embodiment of the present invention. At step 700, the network hub receives a message from a communication network. The communication network may include a cellular telephone network, a SMS network, a MMS network, an email network or the like. At step 710, the message priority application is executed to determine if the message requires priority. Determination of message priority will entail comparing attributes of the message to a listing of attributes requiring priority. For example, the network hub may be configured to provide priority to generic-recipient messages sent from a particular sender or messages having specific content. In addition, to determining whether a message requires prioritization, the application will determine the type of prioritization required. For example, messages from a particular sender may require display prioritization or messages having specific content may require dispatch prioritization.

In the example provided by the flow diagram of FIG. 6, the priority that is determined is display priority. As such, if the message priority application determines that the message requires display priority then, at step 720, the message is provided display priority, in this instance display priority is defined by displaying the assigned message first amongst a listing of messages. Typically, the priority message will remain at or near the first position in the listing as subsequent messages are received and added to the listing, dependent upon how many subsequent messages are also prioritized messages. If the message priority application determines that the message does not require display priority then, at step 730, the message is displayed at the relevant position in the display list. The relevant position may be the first position in the listing if no priority messages currently exist in the listing or the relevant position may be the first position in the listing after the listing of all priority messages.

Alternatively, priority may be determined manually, by a network hub administrator. In such instances, the network hub administrator uses application information, message information, potential recipient information and other related information to determine message priority.

At step 740, the message recipient determination and dispatch application is executed to determine the recipients of the message and to dispatch the message to the determined recipients. The message recipient determination and dispatch application compares predefined attributes of the generic-recipient message to stored information related to potential recipients to determine one or more recipients for the generic-recipient messages. Dispatch of the assigned messages may be accomplished by various message dispatch means. For example, dispatch may be accomplished by short-range wireless communication, whereby recipient RFID identifiers associated with messages and the message are dispatched when the recipients RFID tag is placed in close proximity to the network hub. In other examples, dispatch of the message may be accomplished by transmitting email, voice mail, SMS, MMS or some other form of network communication.

Alternatively, recipient determination may be conducted manually, by a network hub administrator. In such instances, the network hub administrator uses message information, potential recipient information and other related information to determine the recipient(s) of the message.

Once determination of the recipient is made, the recipient will typically be identified on the associated display, if the hub utilizes an associated display for message dispatch. Alternatively, the method may determine the recipient prior to display of the message, such that, upon determination of the recipient the message or message identifier along with the determined recipients are displayed.

At step 750, the process determines whether the dispatched message has been acknowledged by the one or more recipients. Acknowledgement by the recipient insures that the determined recipient has received and acknowledged the message (i.e., read the message or performed the task required of the message). If no acknowledgement is received the network hub either continues to wait for acknowledgement or returns to the message recipient determination and dispatch application step 740. In some embodiments of the invention if the network hub does not receive an acknowledgement within a predefined period of time, the network hub will either dispatch the message to a next-in-line recipient or re-execute the message recipient determination and dispatch application to determine a next-in-line recipient. If the network hub receives an acknowledgement then, at step 760, the address will deleted from the network hub according to applicable deletion logic. Alternatively, the dispatched and acknowledged message may be stored at the network hub for a predefined period of time.

FIGS. 5A and 5B depict flow diagrams of alternate methods for dispatching generic-recipient messages, in accordance with embodiments of the present invention. The methods differ by the means in which the recipients of the generic-recipient messages are determined. In the FIG. 7A embodiment the determination of recipient(s) is conducted manually, at step 800, typically by a network hub administrator who relies on information in the generic-recipient messages, information related to potential recipients and potential recipients availability to determine one or more recipients. In the FIG. 7B embodiment the determination of recipient(s) is conducted, at step 810, by executing a message recipient determination and dispatch application at the network hub. The message recipient determination and dispatch application will compare predefined attributes of the message with predefined attributes of potential recipients to determine one or more message recipients.

Steps 820-850 are characteristic of a network hub that implements short-range wireless communication as the predominate means of dispatching messages. In alternate embodiments of the network hub, other means of dispatch, such as email. SMS, voice mail or the like, may be the predominate chosen means of dispatching messages. At step 820, the network hub makes the determination of whether the recipient's short-range wireless tag is within range to receive short-range wireless communication. If the tag is within range then, at step 830, the network hub will implement Bluetooth, WLAN or some other form of short-range wireless communication to dispatch the message to the determined recipient(s). If the tag is not within range then, at step 840, the network hub will implement email, voice mail, SMS, MMS or some other form of messaging to dispatch the message to the determined recipient(s). At step 850, once the message has been dispatched, the network hub will mark the messages as dispatched.

FIG. 8 illustrates a flow diagram of a method for message dispatch in accordance with an embodiment of the present invention. The method of FIG. 8 implements low power, short-range wireless communication to dispatch messages. As noted previously in the detailed discussion, the invention may also utilize other methods of dispatch, such as email, voice mail, SMS or the like, without departing from the inventive concepts herein disclosed. At step 900, a potential recipient of messages swipes an RFID tag at the network hub device or at the associated display of the network hub device. In the instance in which the network hub has an associated display, the potential recipient may be aware that a message is intended for their dispatch by visual representation on the display. At step 910, the network hub determines if the swiped tag is a new tag and, if it is a new tag, adds the potential recipient and the associated tag to the database of potential recipients.

At step 920, the network hub makes the determination of whether the recipient's short-range wireless tag is within range to receive short-range wireless communication. If the tag is within range then, at step 930, the network hub will implement Bluetooth, WLAN or some other form of short-range wireless communication to dispatch the message to the determined recipient(s). If the tag is not within range then, at step 940, the network hub will implement email, voice mail, SMS, MMS or some other form of messaging to dispatch the message to the determined recipient(s). At step 950, once the message has been dispatched, the network hub will mark the messages as dispatched.

In this regard, FIGS. 6-8 provide for methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Therefore, the present invention provides for devices, methods and computer program products for automatically determining recipients of generic-recipient messages, dispatching generic-recipient messages to proper recipients and prioritizing the dispatch of generic-recipient messages. The device and methods function without an expensive private telephone network or a central system for short incoming text or voice communication. In addition, the device and methods are generally automatic and, thus, require minimal manual intervention by system administrators. Further, the devices and methods are capable of supporting both local and remote message dispatching so as to optimize the system and achieve a lowest cost alternative. In addition, the devices and methods of the present invention dispatch of messages over various communication means, such as short-range wireless, Internet, cellular networks and the like. The devices and methods also provide for multiple priority schemes, such that priority can be given to generic-recipient messages depending on the communication network used to dispatch the message. Additionally, the priority system and methods should be automated to allow for message priority to be determined with minimal manual intervention by system administrators.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the cope of the appended claims. Although specific terms are employed herein, they are used in a generic-recipient and descriptive sense only and not for purposes of limitation.

That which is claimed:

1. A method comprising:
   receiving a generic-recipient message by a network hub;
   determining predefined attributes of the message, wherein the predefined attributes comprise one or more of a sender of the message, a subject of the message, or content of the message;
   determining a type of communication medium of the message;
   determining one or more potential recipients for the message based, at least in part, on the determined type and the predefined attributes by comparing the predefined attributes of the message with stored information related to potential recipients, wherein the stored information includes information identifying one or more receiving devices associated with the potential recipients, and wherein the one or more potential recipients are individuals;
   displaying the message on a display viewable by the one or more potential recipients; and
   dispatching the message to the one or more receiving devices of one or more determined recipients.

2. The method of claim 1, wherein the message is dispatched internally within a physical confines of the network hub using a short-range wireless communication, or wherein the message is dispatched externally beyond the physical confines of the network hub using a Short Message Service message, a Multimedia Message Service message, an electronic mail message or a voice message.

3. The method of claim 1, further comprising:
   determining that one or more acknowledgments by the one or more determined recipients are not received by the network hub within a specified period of time; and
   causing, at least in part, a dispatch of the message to a supervisor of the one or more determined recipients.

4. A method comprising:
   receiving a generic-recipient message by a network hub;
   determining predefined attributes of the message, wherein the predefined attributes comprise one or more of a sender of the message, a subject of the message, or content of the message;
   determining a type of communication medium of the message;
   determining whether the message has priority based, at least in part, on the determined type and on the predefined attributes by comparing the predefined attributes of the message with pre-stored priority information;

prioritizing the message when a determination is made that the message has priority;
displaying the message on a display viewable by the one or more potential recipients;
dispatching the message to one or more receiving devices of one or more determined recipients based on the priority,
wherein the one or more determined recipients are individuals,
wherein the one or more potential recipients are determined by comparing the predefined attributes of the message with stored information related to the potential recipients, and
wherein the stored information includes information identifying the one or more receiving devices.

5. The method of claim 4, wherein determining whether the message has priority based on the predefined attributes further comprises determining whether the message has display priority based on the predefined attributes.

6. The method of claim 5, wherein prioritizing the message when a determination is made that the message has priority further comprises prioritizing a display of the message when a determination is made that the message has display priority.

7. The method of claim 6, wherein prioritizing the display of the message when a determination is made that the message has display priority further comprises directing display of the message in a prominent position on the display associated with the network hub.

8. The method of claim 4, wherein determining whether the message has priority based, at least in part, on the predefined attributes further comprises determining whether the message has dispatch priority based, at least in part, on the predefined attributes.

9. The method of claim 4, wherein prioritizing the message when a determination is made that the message has priority further comprises prioritizing the dispatch of the message when a determination is made that the message has dispatch priority.

10. The method of claim 9, wherein prioritizing the dispatch of the message when a determination is made that the message has dispatch priority further comprises prioritizing a communication medium used to dispatch the message when a determination is made that the message has communication medium dispatch priority.

11. The method of claim 9, wherein prioritizing the dispatch of the message when a determination is made that the message has dispatch priority further comprises prioritizing a time of the dispatch of the message when a determination is made that the message has time dispatch priority.

12. The method of claim 4, wherein the message is dispatched internally within a physical confines of the network hub using a short-range wireless communication, or wherein the message is dispatched externally beyond the physical confines of the network hub using a Short Message Service message, a Multimedia Message Service message, an electronic mail message or a voice message.

13. The method of claim 4, wherein the network hub is a wireless network hub.

14. An apparatus comprising at least one processor and at least one memory storing computer program code, wherein the at least one memory and stored computer program code are configured to, with the at least one processor, cause the apparatus to at least:
receive a generic-recipient message from one or more communication networks;
determine predefined attributes of the message, wherein the predefined attributes comprise one or more of a sender of the message, a subject of the message, or content of the message;
determine a type of communication medium of the message;
determine one or more potential recipients for the message based, at least in part, on the determined type and the predefined attributes by comparing the predefined attributes of the message with stored information related to the potential recipients, wherein the stored information includes information identifying one or more receiving devices associated with the potential recipients, and wherein the one or more potential recipients are individuals;
display the message on a display viewable by the one or more potential recipients; and
dispatch the message to the one or more receiving devices of one or more determined recipients.

15. The apparatus of claim 14, wherein the dispatch of the message is via lower power Radio Frequency.

16. The apparatus of claim 14, wherein the dispatch of the message is via a digital cellular network.

17. The apparatus of claim 14, wherein the dispatch of the message is via a communication network, and the apparatus is further caused, at least in part, to:
determine that one or more acknowledgments by the one or more determined recipients are not received by the network hub within a specified period of time; and
cause, at least in part, a dispatch of the message to a supervisor of the one or more determined recipients.

18. The apparatus of claim 17, wherein the message is dispatched internally within a physical confines of the network hub using a short-range wireless communication, or wherein the message is dispatched externally beyond the physical confines of the network hub using a data network, a Short Message Service network, a Multimedia Message Service network or a telephony network.

19. The apparatus of claim 14, further comprising the display associated with the apparatus that is configured to, under the direction of the at least one memory and stored computer program code, display a message associated with a Radio Frequency identifier.

20. An apparatus comprising at least one processor and at least one memory storing computer program code, wherein the at least one memory and stored computer program code are configured to, with the at least one processor, cause the apparatus to at least:
receive a generic-recipient message from one or more communication networks;
determine predefined attributes of the message, wherein the predefined attributes comprise one or more of a sender of the message, a subject of the message, or content of the message;
determine a type of communication medium of the message;
determine whether the message has priority based, at least in part, on the determined type and on the predefined attributes by comparing the predefined attributes of the message with pre-stored priority information;
display the message on a display viewable by the one or more potential recipients; and
dispatch the prioritized message to one or more receiving devices of one or more determined recipients based on the priority,
wherein the one or more determined recipients are individuals, wherein the one or more potential recipients are determined by comparing the predefined attributes of the message with stored information related to the potential recipients, and wherein the stored information includes information identifying the one or more receiving devices.

21. The apparatus of claim 20, wherein the at least one memory and stored computer program code are configured to, with the at least one processor, further cause the apparatus to compare the predefined attributes to pre-stored display priority information to determine if the message requires display prioritization.

22. The apparatus of claim 21, further comprising the display associated with the apparatus that is configured to, under the direction of the at least one memory and stored computer program code, display message identifiers to one or more recipients.

23. The apparatus of claim 21, wherein the at least one memory and stored computer program code are configured to, with the at least one processor, further cause the apparatus to display prioritized messages first in a list of messages, display prioritized messages in a new viewable window, or display prioritized messages in a highlighted form.

24. The apparatus of claim 20, wherein the at least one memory and stored computer program code are configured to, with the at least one processor, further cause the apparatus to compare the predefined attributes to pre-stored dispatch priority information to determine if the message requires dispatch prioritization.

25. The apparatus of claim 24, wherein the at least one memory and stored computer program code are configured to, with the at least one processor, further cause the apparatus to provide for dispatch prioritization that includes either prioritizing a time at which messages will be dispatched, prioritizing a communication medium used to dispatch messages or prioritizing recipients of the dispatched message.

26. A non-transitory computer-readable storage medium carrying one or more sequences of one or more instructions which, when executed by one or more processors, cause an apparatus to at least perform the following steps:

directing storage of information related to potential message recipients, wherein the stored information includes information identifying one or more receiving devices associated with the potential recipients;

receive a generic-recipient message by a network hub and determining predefined attributes associated with the generic-recipient message, and wherein the predefined attributes comprise one or more of a sender of the message, a subject of the message, or content of the message;

determining a type of communication medium of the message;

determining one or more potential recipients of the generic-recipient message based, at least in part, on the determined type and the predefined attributes by comparing the predefined attributes associated with the message to the stored information related to the potential recipients, wherein the one or more potential recipients are individuals;

displaying the message on a display viewable by the one or more potential recipients; and dispatching the message to the one or more receiving devices of one or more determined recipients.

27. The non-transitory computer-readable storage medium of claim 26, wherein the apparatus is caused, at least in part, to further perform:

determining the type of the communication medium of the message including instructions configured for determining whether the message is a Short Message Service message, a Multimedia Message Service message, an electronic mail message, or a voice message.

28. The non-transitory computer-readable storage medium of claim 26, wherein the network hub is a wireless network hub, and the apparatus is caused, at least in part, to further perform:

determining that one or more acknowledgments by the one or more determined recipients are not received by the network hub within a specified period of time; and causing, at least in part, a dispatch of the message to a supervisor of the one or more determined recipients.

29. The non-transitory computer-readable storage medium of claim 26, wherein the apparatus is caused, at least in part, to further perform:

directing display of the message on a display associated with the network hub.

30. The non-transitory computer-readable storage medium of claim 29, wherein the apparatus is caused, at least in part, to further perform:

directing display of the message, which is associated with a Radio Frequency identifier, on a display associated with the network hub, wherein the recipient Radio Frequency identifier is associated with the radio frequency tag or radio frequency tag reader.

31. The non-transitory computer-readable storage medium of claim 26, wherein the message is dispatched internally within a physical confines of the network hub using a short-range wireless communication, or wherein the message is dispatched externally beyond the physical confines of the network hub via a communication medium chosen from the group of communication medium that includes either an Internet communication medium, a Short Message Service communication medium, a Multimedia Message Service communication medium or a telephony medium.

32. A non-transitory computer-readable storage medium carrying one or more sequences of one or more instructions which, when executed by one or more processors, cause an apparatus to at least perform the following steps:

directing storage of information related to message priority;

receiving a generic-recipient message by a network hub and determining predefined attributes associated with the generic-recipient message, and wherein the predefined attributes comprise one or more of a sender of the message, a subject of the message, or content of the message;

determining a type of communication medium of the message;

determining whether the message has priority based, at least in part, on the determined type and on the predefined attributes by comparing the predefined attributes associated with the message to the stored information related to message priority;

displaying the message on a display viewable by the one or more potential recipients; and dispatching the prioritized message to one or more receiving devices of one or more determined recipients based on the priority, wherein the one or more determined recipients are individuals, wherein the one or more potential recipients are determined by comparing the predefined attributes of the message with stored information related to potential recipients, and wherein the stored information includes information identifying the one or more receiving devices.

33. The non-transitory computer-readable storage medium of claim 32, wherein the apparatus is caused, at least in part, to further perform:

directing storage of information related to message display priority; and determining whether the message has display priority by comparing the predefined attributes associated with the message to the stored information related to message display priority.

34. The non-transitory computer-readable storage medium of claim 32, wherein the apparatus is caused, at least in part, to further perform:

directing storage of information related to message dispatch priority; and determining whether the message has dispatch priority by comparing the predefined attributes associated with the message to the stored information related to message dispatch priority.

35. The non-transitory computer-readable storage medium of claim 32, wherein the message is dispatched internally within a physical confines of the network hub using a short-range wireless communication, or wherein the message is dispatched externally beyond the physical confines of the network hub using a Short Message Service message, a Multimedia Message Service message, an electronic mail message, or a voice message.

36. The method of claim 4, further comprising displaying the message on a display responsive to a radio frequency tag or a radio frequency tag reader being placed in proximity to the network hub.

37. The method of claim 1, wherein directing dispatch of the message to the one or more determined recipients includes assigning recipient Radio Frequency identifiers, associated with a radio frequency tag or a radio frequency tag reader associated with a recipient of the message, to the message, and dispatching the message when the radio frequency tag or the radio frequency tag reader is placed in proximity to the network hub.

38. The method of claim 4, wherein the determination to dispatch the message is based, at least in part, on when a recipient-assigned Radio Frequency identifier associated with a radio frequency tag or a radio frequency tag reader associated with a recipient of the message is placed in proximity to the network hub.

39. The apparatus of claim 14, wherein the at least one memory and stored computer program, with the at least one processor, cause the apparatus to cause, at least in part, a dispatch of the message to the one or more determined recipients based, at least in part, on the determined type of the communication medium of the message by assigning recipient Radio Frequency identifiers, associated with a radio frequency tag or a radio frequency tag reader associated with a recipient of the message, to the message, and when the radio frequency tag or the radio frequency tag reader is placed in proximity to the communication networks.

40. The apparatus of claim 20, wherein the at least one memory and stored computer program code, with the at least one processor, cause the apparatus to determine to dispatch the prioritized message when a recipient-assigned Radio Frequency identifier associated with a radio frequency tag or a radio frequency tag reader associated with a recipient of the message is placed in proximity to the one or more communication networks.

41. The apparatus of claim 26, wherein the directing dispatch of the message to the one or more determined recipients includes assigning recipient Radio Frequency identifiers, associated with a radio frequency tag or a radio frequency tag reader associated with a recipient of the message, to the message, and dispatching the message when the radio frequency tag or the radio frequency tag reader is placed in proximity to the network hub.

42. The non-transitory computer-readable storage medium of claim 32, wherein dispatching the prioritized message occurs when a recipient-assigned Radio Frequency identifier associated with a radio frequency tag or a radio frequency tag reader associated with a recipient of the message is placed in proximity to the network hub.

43. The method of claim 1, further comprising:

recording the one or more determined recipients and an acknowledgement that the one or more determined recipients has received the message in message information associated with the message.

44. The method of claim 1, wherein the stored information includes information indicating whether the one or more receiving devices are capable of communicating in short-range wireless communication.

45. The method of claim 1, wherein the displaying of the message on the display viewable by the one or more potential recipients is performed before the dispatching of the message to the one or more receiving devices of the one or more determined recipients.

* * * * *